No. 657,417. Patented Sept. 4, 1900.
H. INMAN.
BOX COVERING MACHINE.
(Application filed Nov. 11, 1898.)
(No Model.) 4 Sheets—Sheet 3.
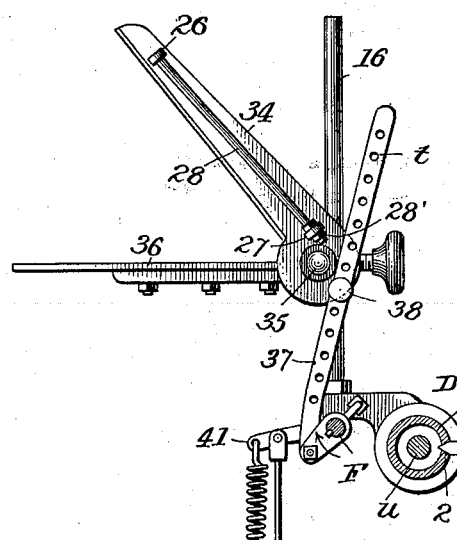
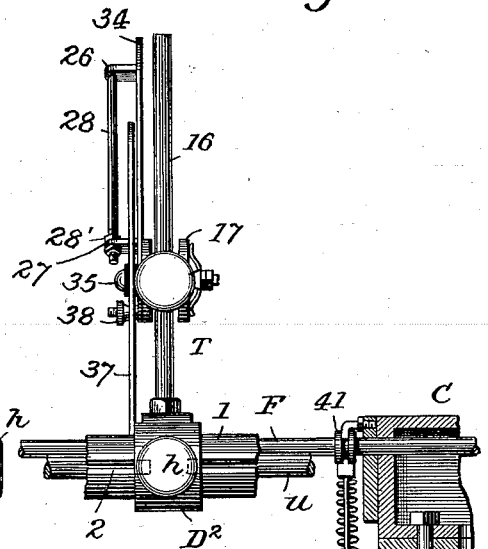
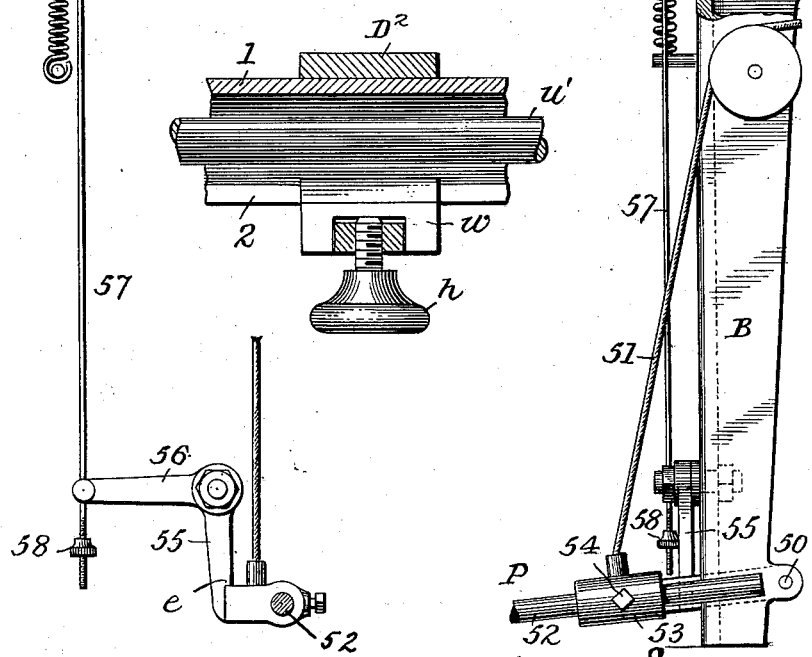

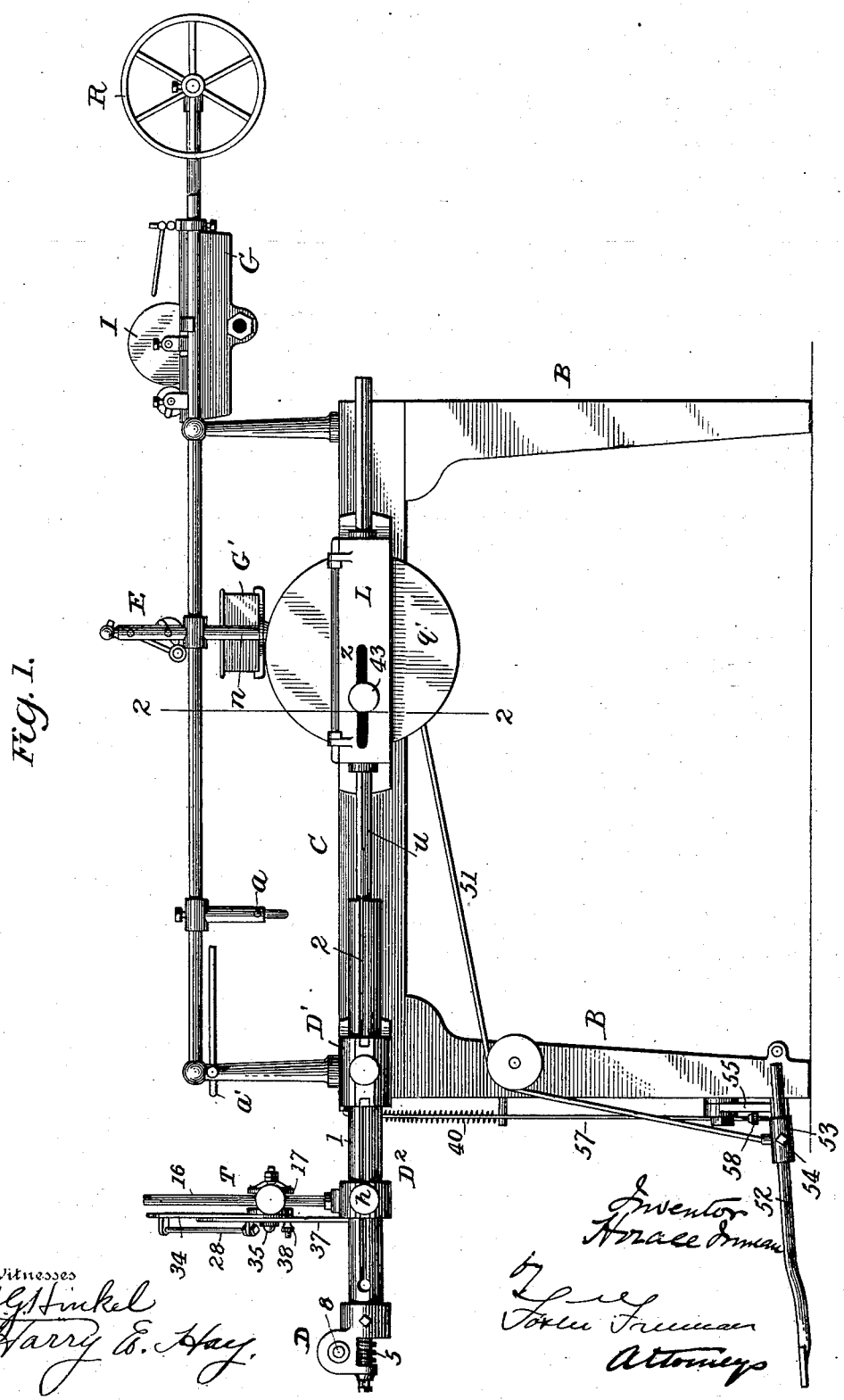

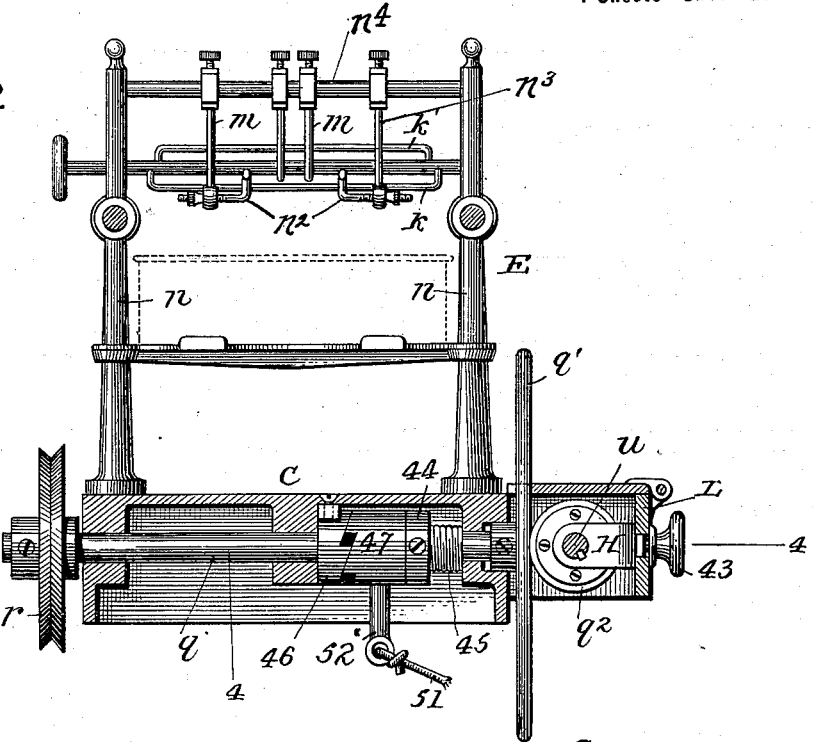
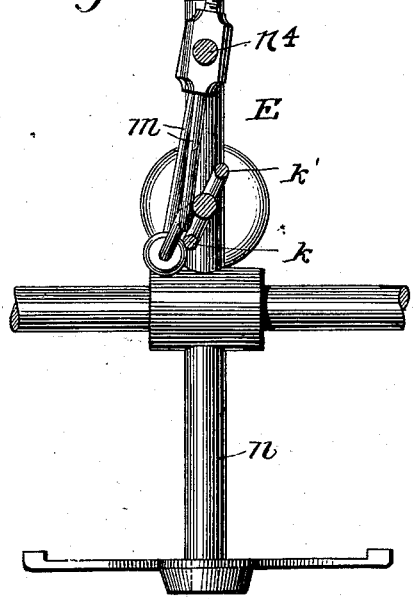
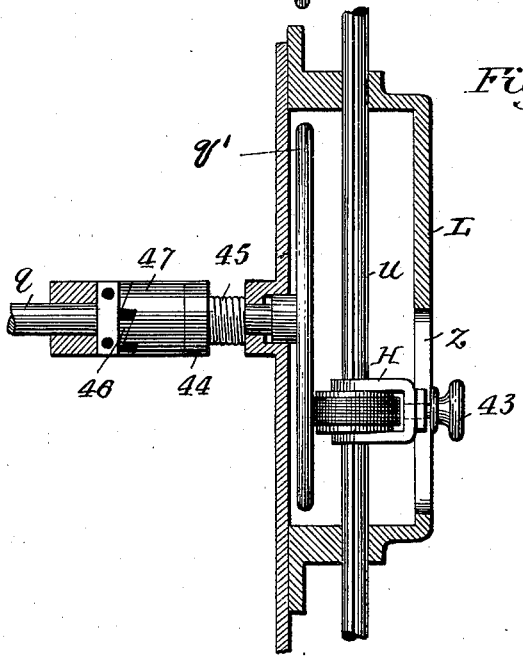

No. 657,417. Patented Sept. 4, 1900.
H. INMAN.
BOX COVERING MACHINE.
(Application filed Nov. 11, 1898.)
(No Model.) 4 Sheets—Sheet 4.
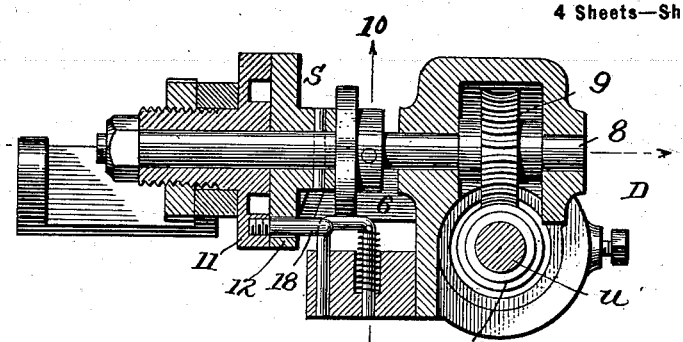
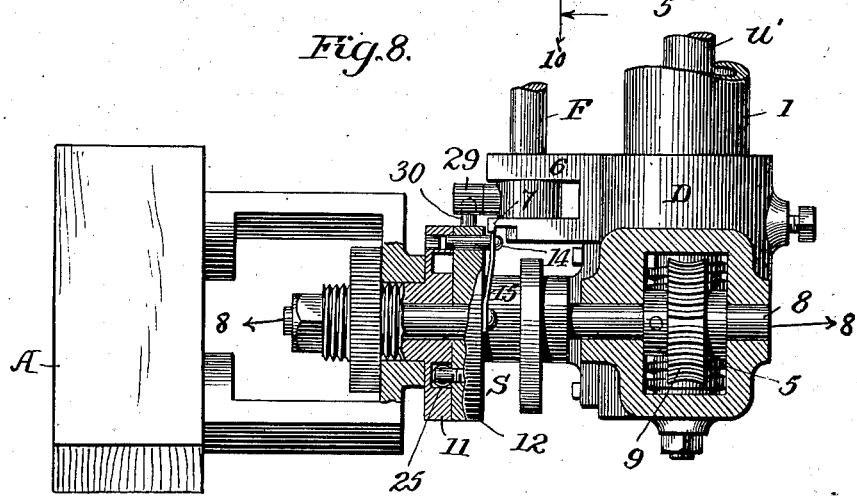
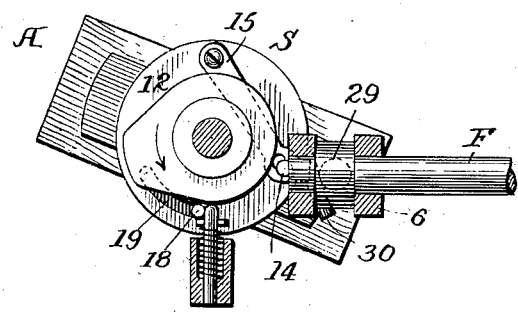

UNITED STATES PATENT OFFICE.

HORACE INMAN, OF AMSTERDAM, NEW YORK.

BOX-COVERING MACHINE.

SPECIFICATION forming part of Letters Patent No. 657,417, dated September 4, 1900.

Application filed November 11, 1898. Serial No. 696,166. (No model.)

*To all whom it may concern:*

Be it known that I, HORACE INMAN, a citizen of the United States, residing at Amsterdam, in the county of Montgomery and State of New York, have invented certain new and useful Improvements in Box-Covering Machines, of which the following is a specification.

My invention relates to apparatus for covering boxes with paper; and it consists in certain improvements in that class of apparatus illustrated in my Letters Patent No. 585,820, dated July 6, 1897, as fully set forth hereinafter and as illustrated in the accompanying drawings, in which—

Figure 1 is a side elevation of my improved apparatus. Fig. 2 is a transverse section on the line 2 2, Fig. 1; Fig. 3, a detached elevation of a part of the apparatus connected with the guide-fingers. Fig. 4 is a longitudinal section on the line 4, Fig. 2. Fig. 5 is a detached view of the paper-cutter and connected parts; Fig. 6, an edge view of the parts shown in Fig. 5 with the frame in part section; Fig. 7, a detached sectional view of one of the clamping devices; Fig. 8, a detached sectional view showing the box form and some of the connected parts; Fig. 9, a section on the line 8 8, Fig. 8; Fig. 10, a section on the line 10 10, Fig. 9. Fig. 1 is on a smaller scale than the other figures.

The main frame of the machine consists of a table C and suitable supports or legs B, the table having bearings for the main driving-shaft $q$, upon the outer end of which is a grooved pulley $r$, to which a continuous rotation is imparted during the operation of the machine. A secondary or supplementary driving-shaft $u$ turns in bearings at one side of the machine, from which shaft $u$ the box-holder or box-form A is driven through the medium of devices hereinafter described.

Upon a supplemental frame E above the table C are supported one or more reels R for one or more strips of paper, a paste-trough G, in which turns freely a paste-roller I, and a series of bars and fingers $k$ $k'$ $m$, adjustable to guide the different pasted strips, together with adjustable guide-rods $a$ $a$, and beneath the fingers $m$ is a trough G', supported from vertical side bars $n$ $n$ in position to receive any paste drippings from the strips passing over the rods and adjacent to the fingers.

The box-form A is connected to the part 11 of a clutch S, consisting of the part 11 and a part 12, locked at times together by a locking-pin 14 on a spring 15 and at times unlocked to permit a temporary arrest of the part 11 during the revolution of the part 12 under the action of an internal spring 25 and limited by the play of a stop-pin 18 in a slot 19 of the part 12, as will be fully understood upon reference to the said Letters Patent granted to me July 6, 1897, in connection with Figs. 7, 8, 9, and 10 thereof, and which need not be here more fully set forth. In the present construction there is a bracket 6 with a projection 7, having an inclined edge with which the end of the spring 15 makes contact, the spring being thereby withdrawn, carrying with it the locking-pin 14 at proper intervals. The part 12 of the clutch S is secured to a shaft 8, turning in bearings upon a bracket D and provided with a worm-wheel 9, engaging a worm 5 upon the shaft $u$, the end of which has its bearings in the said bracket D. The bracket D is at the end of a tube 1, through which the shaft $u$ extends, and this tube also passes through a bracket D', secured to the frame of the machine and adjustable longitudinally so as to carry the box-form to a greater or less extent from the end of the main frame, as is necessary when the sizes of the box-forms are changed, and as is also necessary when in operation upon different forms and sizes of boxes it is requisite to expose the paper with the paste upon it for a longer or shorter time before applying it to the box.

In order to permit the ready adjustment of the tube 1, carrying with it the shaft $u$, and at the same time secure it firmly in position, so that it will not be liable to become loose, I split one side of the tube, forming a longitudinal channel 2 with beveled edges, and I recess the bracket D' to receive a U-shaped key $w$, having a V-shaped inner edge entering the recess 2, as shown in Fig. 5, and a set-screw $h$ bears against this key, and by forcing the latter inward the split tube 1 is expanded, so as to become firmly wedged in the bracket. A similar device is made use of for securing an adjustable cutter-frame T movably upon the tube 1. This frame T is supported by a collar $D^2$, sliding upon the tube 1 and provided with a key $w$ and set-screw $h$, corresponding to these parts supported by the bracket D'. The frame T has a vertical standard 16, upon which is secured adjustably a hub 17, from which extends the lower horizontal knife 36 of the cutter, and upon a pin 35 swings the upper knife 34. This knife 34, instead of being of stiff rigid plate, as heretofore, is made light and flexible and is stiffened by means of a brace, which tends to hold it in shape and permits it to be slightly bowed, so as to insure a good shearing cut against the lower knife. The brace, as shown, consists of a screw-rod 28, extending through two eyes 26 27 and provided with nuts 28', by means of which it may be tightened. The knife 34 is vibrated from a shaft F, Figs. 5 and 10, the forward end of the shaft turning in a projection 6 of the bracket D and being provided with an arm 29, carrying a friction-roll $29^a$, and arranged to be struck by a pin 30, extending from the clutch S. The contact of the pin 30 with the arm 29 rocks the shaft F in the direction of its arrow, Fig. 5, and thereby operates the knife 34 through the medium of an arm and a connection-rod 37, attached to the heel of the knife by a pin 38. Preferably the rod 37 has a series of openings $t$ to permit of desirable adjustments. A spring 40, connected to an arm 41, extending from the shaft F, swings the latter in one direction to lift the knife.

I have found that difficulties are experienced with this class of machines from the uniform speed of operation of the parts, which is the same in covering large boxes as in covering small ones, and I have therefore provided means whereby the speed of operations of the working parts may be changed at will and whereby also the transition from a state of rest to a state of motion, and vice versa, may be effected without varying the operation or movements of the main driving-shaft. To this end I place at one end of the driving-shaft $q$ a friction-disk $q'$, which engages with a friction-pulley $q^2$ upon the shaft $u$, the shaft and pulley provided with slots and a feather to permit the adjustment of the pulley $q^2$ upon the shaft and also to permit the shaft to be moved longitudinally independently of the pulley when the tube 1 is carried inward or outward. I also combine with the pulley $p^2$ any suitable carrier and retaining means. For instance, a movable bracket H has arms straddling the pulley $q^2$ and is perforated for the passage of the shaft $u$ and extends into a slot $z$ in a box L, bolted to one side of the frame of the machine. A set-screw 43 passes through the slot $z$ of the bracket H, and when loosened serves as a ready means of setting the pulley $q^2$ at any required distance from the center of the disk $q'$ to determine the speed of the operating parts, and then by tightening the said screw the bracket is secured in place. The operating parts may be started and stopped less abruptly than by the use of ordinary gearing by shifting the disk $q'$. This may be done in different ways; but, as shown, the shaft $q$ has a slight longitudinal play in its bearings and is provided with a collar 44, against which bears a spring 45, tending to throw the gears apart. To the under side of the table C is bolted a collar 46, having inclined teeth corresponding to the inclined teeth upon the sleeve 47, mounted loosely on the shaft $q$. By turning the sleeve 47 in the direction of its arrow, Fig. 2, it rides upward upon the inclined faces of the collar 46 and, bearing on the collar 44, presses the disk against the pulley $q^2$.

The collar 47 is turned to effect the above-described results by means of a treadle P, pivoted at 50 to one of the legs of the frame, a cord 51, suitably guided and connected to the treadle, and an arm 52, extending from the collar 47. In order to adapt these operations to the varying adjustments of the box-form at different distances from the frame, which adjustments render it necessary for the operator to change his position relative to the frame, the treadle P is made extensible in any suitable manner. For instance, it is in two parts 52 53, the part 52 extending through a box on the part 53, adjustable therein and secured by a set-screw 54. In order that it may not be necessary for the operator to maintain his foot upon the treadle, I provide a pawl 55, pivoted to the frame, with a shoulder $e$, which engages a projecting portion of the treadle as soon as the latter is depressed and holds it in place. I provide means whereby the pawl 55 is withdrawn, so as to arrest the machine as the paper passing to the box upon the box-form is severed. A simple construction to this end consists of an arm 56, extending from a pawl 55, having a lug with a recess for the passage of the rod 57, connected at the upper end to the arm 41 of the shaft F and threaded at the lower end to receive a nut 58. The nut is adjusted to permit a certain amount of lost motion, so that the pawl is only shifted as the severing of the sheet is completed. It will be seen that when the treadle 52 is depressed the disk $q'$ is brought against the pulley $q^2$ and the box form starts its rotation. This will continue until one complete rotation is made, when the contact of the pins 30 29 and rocking of the lever F, Fig. 8, will lift the arm 41 and rod 57, Fig. 5, until the nut 58 strikes the arm 56 and carries the detent 55 away from the treadle, which will at once rise as the spring 45 carries the disk $q'$ from the pulley $q^2$ and arrests the movements of the parts driven from said pulley. By adjusting the nut 58 the moment of releasing the treadle can be accurately determined.

It will be evident that any suitable clutch-gears or mechanism may be substituted for that shown for starting and stopping the box-form shaft. It will also be evident that any suitable adjustable contact-pin may be substituted for the nut 58.

In addition to the guide-rods and fingers set forth in my prior patent I show two adjustable rods $n^2\ n^2$, Figs. 2 and 3, with upturned ends, so arranged as to bear upon the edges of different strips of paper and serve to properly guide the same. These rods $n^2$ are each adjustable rotatively and longitudinally in the vertical rod $n^3$, which is adjustable on the cross-bar $n^4$.

Without limiting myself to the precise construction and arrangement of parts shown, I claim as my invention—

1. The combination, in a box-covering machine, with the main driving-shaft adapted to rotate at a uniform speed continuously, a box-form, an adjustable rotating support for the form, a cutting mechanism, and means for operating the same of a variable gear having movable parts to transmit movement from the driving-shaft to the said rotating support, and means for shifting the same for changing the speed at which the box-form is rotated without dismembering or removing any part of the gear, substantially as set forth.

2. The combination, in a box-covering machine, of a main driving-shaft, a box-form, a rotating support for the box-form, a cutting mechanism, means operated by the rotating support to operate the cutting mechanism, a clutch mechanism to transmit movement from the driving-shaft to the said rotating support, means to lock the clutch mechanism in operative position, and means operated by the cutting mechanism to release the clutch mechanism, substantially as described.

3. The combination in a box-covering machine, of the bracket D', tube 1 adjustably supported in the bracket, a rotatable box-form supported by the tube 1 and movable with it, a cutting mechanism supported on the tube 1 and movable with it, and means to adjust the cutting mechanism on the tube 1 independently of its movement with the tube, substantially as described.

4. The combination of the box-form, bracket carrying the same, a shaft $u$ having its bearing in said bracket, a support for the bracket longitudinally adjustable on the frame of the machine and consisting of a split tube, a bracket receiving said tube, and a wedge-like key and means for forcing it into the channel of the tube, substantially as set forth.

5. The combination with the cutter, and with the box-form of a box-covering machine, of a slotted tube 1, a collar receiving said tube and supporting the cutter-frame, a wedge-shaped key carried by the collar, and set-screw for adjusting said key, substantially as set forth.

6. The combination, in a box-covering machine having a box-form and an adjustable support therefor, of stopping and starting mechanism, and an extensible treadle connected with said stopping and starting mechanism, substantially as set forth.

In testimony whereof I have signed my name to this specification in the presence of two subscribing witnesses.

HORACE INMAN.

Witnesses:
H. B. WALDRON,
H. A. INMAN.